United States Patent Office 3,271,417
Patented Sept. 6, 1966

3,271,417
1,2-THIAZETIDINE-3-ONE-1-OXIDES AND
THEIR PREPARATION
James C. Martin, Kingsport, Tenn., assignor to Eastman Kodak Company, Rochester, N.Y., a corporation of New Jersey
No Drawing. Filed Feb. 6, 1963, Ser. No. 256,525
4 Claims. (Cl. 260—327)

This invention relates to novel organic compounds and more particularly to 1,2-thiazetidine-3-one-1-oxides and to their method of preparation by combining ketenes with N-sulfinylamines.

Kresze et al., in Angew. Chem. internat. Edit., 1, 97 (1962), state that N-sulfinylaniline does not react with diphenylketene, but that the more reactive N-sulfinyl-p-toluenesulfonamide does. Kresze et al. do not disclose the procedure employed in their failure to achieve the reaction. However, Beecken et al., in Tetrahedron, 18, 1527 (1962) indicate in a footnote that Kresze used a very dilute solution for the attempted reaction. I have discovered contrary to Kresze et al., that N-sulfinylaniline does react with diphenylketene, as well as with other ketenes, when the reaction is carried out in the absence of a solvent or in solutions of sufficient concentration.

My discovery has made possible the production of a large number of novel chemical compounds which are reaction products of ketenes with N-sulfinylamines. These compounds are useful as chemical reagents or intermediates in the production of useful derivatives. For example, the compounds of the invention undergo a coupling reaction with aromatic aldehydes, such as p-dimethylaminobenzaldehyde to produce compounds useful as textile dyes. A valuable property of the compounds of the invention are that they are hydrolytically stable. Kresze et al. report that the N-sulfonyl-1,2-thiazetidine-3-one-1-oxides which he prepares are moisture sensitive. In contrast, the compounds of the present invention, namely, the 1,2-thiazetidine-3-one-1-oxides, are stable to moisture and exhibit little tendency to hydrolyze even when exposed to the atmosphere for several days.

In general, the method of the invention comprises combining a ketene with an N-sulfinylamine, either without a solvent or with a solvent in concentration sufficient to produce the 1,2-thiazetidine-3-one-1-oxides in substantial yield, and thereafter recovering the latter product, for example, by distillation or recrystallization. The method of the invention and the novel product thereof can be illustrated by the following equation:

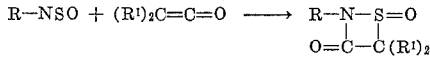

I have found that the method of the invention is broadly applicable to N-sulfinylamines in general. Accordingly, R in the above equation represents a broad range of monovalent organic radicals which form sulfinylamines with the radical, —NSO, in contrast to amides, as employed by Kresze et al. Thus, R can be alkyl, e.g., of 1–18 carbon atoms; cycloalkyl, preferably cyclobutyl, cyclopentyl or cyclohexyl; aryl, including substituted aryl, preferably phenyl or substituted phenyl; or heterocyclic, e.g., C-pyridyl, piperidinyl, etc. A characteristic of these radicals R is that they are either electron-donating, or substantially less electron-withdrawing than the arylsufonyl radical of the N-sulfinyl sulfonamide of Kresze et al. Especially, preferred substituents R are phenyl and lower alkyl.

Bifunctional and other polyfunctional N-sulfinylamines can also be used in the method as illustrated by the following equation:

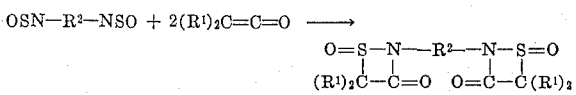

In its use of polyfunctional N-sulfinylamines the reaction occurring in the method of the invention can be illustrated by the general equation:

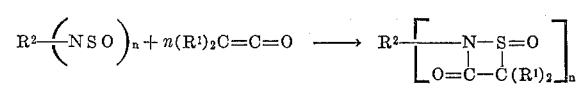

wherein $n$ is a plural integer. In the latter two equations $R^2$ is a polyvalent organic radical, e.g., alkylene, cycloalkylene, or arylene.

N-sulfinylamines that can be used in the method of the invention and their methods of preparation are disclosed by Kresze et al. in Angew. Chem. internat. Edit., 1, 89–98 (1962). Others are disclosed by A. Dorlars in "Method der Organischen Chemie (Houben-Weyl)," vol. 11/2, E. Muller, editor, Georg Thieme Verlag, Stuttgart, Germany, 1958, pp. 738–744.

Some suitable N-sulfinylamines are:

N-sulfinylaniline,
p-nitro-N-sulfinylaniline,
m-nitro-N-sulfinylaniline,
p-dimethylamino-N-sulfinylaniline,
p-methoxy-N-sulfinylaniline,
p-methyl-N-sulfinylaniline,
m-chloro-N-sulfiinylaniline,
N-sulfiinyl-β-naphthylamine,
N-sulfinylcyclohexylamine,
N-sulfinyl-tert-butylamine,
N-sulfinyl-tert-octylamine,
N-sulfinylmethylamine,
N-sulfinylpropylamine,
N-sulfinylbutylamine,
N-sulfinylisobutylamine,
N-sulfinylallylamine,
N-sulfinyloctylamine,
N-sulfinyldodecylamine,
N-sulfinyl-2-methoxyethylamine,
N-sulfinyl-3-aminopropionitrile,
N-sulfinyl-3-methoxypropylamine,
N-sulfinyl-3-dimethylaminopropylamine,
N-sulfinyl-2-ethylhexylamine,
N,N'-disulfinyl-1,6-hexanediamine,
N,N'-disulfinyl-1,2-ethanediamine,
N,N'-disulfinyl-1,4-butanediamine,
N,N'-disulfinyl-p-xylylenediamine,
N,N'-disulfinyl-m-xylylenediamine,
N,N'-disulfinyl-1,4-cyclohexanebismethylamine,
N,N'-disulfinyl-1,3-cyclohexanebis-methylamine,
N,N'-disulfinyl-1,8-p-menthanediamine,
N,N'-disulfinyl-p-phenylenediamine,
N,N'-disulfinyl-m-phenylenediamine,
N,N'-disulfinyl-2,4-toluenediamine,
N,N'-disulfinyl-o-tolidine,
N,N'-disulfinyl-4,4'-methylenedianiline,
N,N'-disulfinyl-4,4'-sulfonyldianiline,
N-sulfinyl-2-aminothiazole, etc.

The number of N-sulfinylamines that are useful in the method of the invention is quite large and the above-mentioned compounds are only illustrative.

The method of the invention is of similar broad scope with respect to the ketenes which can be used. The method can employ simple ketene, the aldoketenes or the ketoketenes.

Thus, the substituents $R^1$ in the above equations can be the same or different substituents such as hydrogen, alkyl containing up to about 10 carbon atoms, cycloalkyl, aryl, including substituted aryl, halogen, acyl, alkoxy, aryloxy, or bivalent radicals which are joined to form a carbocyclic or heterocyclic ring with the carbon atom to which they are attached.

A preferred class of ketenes comprises the ketoketenes or di-substituted ketenes described in Belgian Patent No. 595,298 and Canadian Patent 618,772. Typical ketoketenes include: dimethyl-, diethyl-, methylpropyl-, butylethyl-, isobutylethyl-, diethyl-, dihexyl-, dioctyl-, pentamethylene-, hexamethylene-, and the like. Typical aldo- or mono-substituted ketenes include: methyl-, ethyl-, propyl-, butyl-, octyl-, and others described by Hanford and Sauer in "Organic Reactions," vol. III, Roger Adams, editor, John Wiley and Sons, Inc., New York, 1946, pp. 108–140. Arylketenes and mixed alkylarylketenes are also suitable. These include the following ketenes: diphenyl-, ethylphenyl-, phenyl-, benzyl-, methylphenyl-, etc. Still other suitable ketenes include: chloroketene, acetoxyketene, phenoxyketene.

In preparing the compounds of the invention, I generally prefer to use an equimolar ratio of ketene to N-sulfinylamine. In the case of a bifunctional N-sulfinylamine, either 1 or 2 moles of ketene may be used, depending upon the product desired. The temperature of the subject reaction is generally governed by the nature of the reactants. Temperatures ranging from 0° to 180° have been used.

Although a solvent is not always necessary, it is frequently advantageous to use one. Suitable solvents include esters, ethers, aliphatic and aromatic hydrocarbons and chlorinated hydrocarbons, nitriles, etc. Also useful are certain dipolar aprotic solvents as: nitromethane, nitrobenzene, dimethylformamide, dimethylacetamide, tetramethylene sulfone, propylene carbonate, dimethylsulfoxide, etc. I have discovered that the N-sulfinylamines will react with ketenes in a solvent but the solution must not be too dilute. In general the reaction mixture, including the two reactants and the solvent, should contain no more than about 90 weight percent solvent, i.e., a 10 percent solution of reactants. Best results are obtained when no more than 75 weight percent inert solvent is used and excellent results are obtained in a number of these reactions with no solvent at all.

The ketenes can be introduced into the reaction vessel as pure materials, as the main component of a pyrolysate from a thermal cracking operation, or can be generated in situ from the acid halide [Opitz and Kleeman, Angew. Chem. internat. Edit., 1, 51 (1962).

The following examples illustrate the method and products of the invention.

*Example 1*

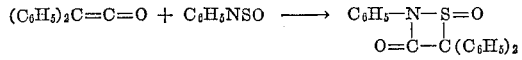

A mixture of 25 g. (0.13 mole) of diphenylketene and 17.9 g. (0.13 mole) of N-sulfinylaniline slowly warmed to 80° on mixing. The solution became viscous and crystallized. Recrystallization from ethyl alcohol gave 37 g. (86%) of 2,4,4-triphenyl-1,2-thiazetidine-3-one-1-oxide, M.P. 113–114°.

*Analysis.*—Calcd. for $C_{20}H_{15}NO_2S$: C, 72.1; H, 4.5; N, 4.2; S, 9.6; mol. wt., 333. Found: C, 72.3; H, 4.6; N, 4.3; S, 9.9; mol. wt. (ebullioscopic in acetone), 333.

*Example 2*

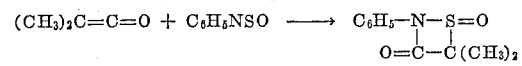

To a stirred solution of 70 g. (0.5 mole) of N-sulfinylaniline in 200 ml. of benzene was added 35 g. (0.5 mole) of dimethylketene. The solution was kept at 25° for 6 hours and then distilled through a 12-in. packed column to give unchanged N-sulfinylaniline and 17 g. of 4,4-dimethyl-2-phenyl-1,2-thiazetidine-3-one-1-oxide, B.P. 124–127° (0.5 mm.).

*Analysis.*—Calcd. for $C_{10}H_{11}NO_2S$: C, 57.4; H, 5.3. Found: C, 57.2; H, 5.3.

*Example 3*

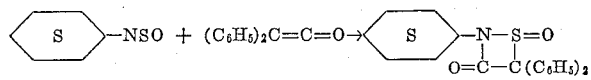

A mixture of 1.45 g. (0.01 mole) of N-sulfinylcyclohexylamine and 1.94 g. (0.01 mole) of diphenylketene liberated heat and rapidly changed to a white solid. This reaction mixture was washed with hexane to give a high yield of 2-cyclohexyl-4,4-diphenyl-1,2-thiazetidine-3-one-1-oxide, M.P. 145–147°.

As I have mentioned, the method of the invention is useful in preparing compounds that can be coupled with aldehydes to produce dyes. The following example describes such a use.

*Example 4*

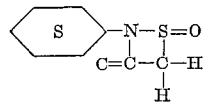

N-sulfinylcyclohexylamine was reacted with ketene in accordance with the method of the invention to produce 2-cycolhexyl-1,2-thiazetidine-3-one-1-oxide. The reaction product was then reacted in equimolar proportions at room temperature with p-dimethylaminobenzaldehyde by the procedure of the Knoevenagel Condensation using a trace of piperidine as catalyst and ethyl acetate as solvent. The solvent was evaporated from the reaction product under vacuum. The residue was recrystallized from benzene to recover a yellow solid, M.P. 71–73° C., having utility as a textile dye, particularly for hydrophobic linear polyester fibers, e.g., of the types disclosed in U.S. 2,901,446 and U.S. 2,465,319.

The compounds of the invention also show promise as valuable stabilizing additives for polyolefin resins such as polypropylene when added thereto in small amounts, e.g., 0.01–0.5 weight percent.

The invention has been described in detail with particular reference to preferred embodiments thereof, but it will be understood that variations and modifications can be effected within the spirit and scope of the invention as described hereinabove and as defined in the appended claims.

I claim:

1. The method of producing a compound of the formula:

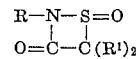

which comprises contacting a ketene of the formula, $(R^1)_2C=C=O$, with an N-sulfinylamine of the formula, $R-N=S=O$, at about 0 to 180° C. in substantially equimolar proportions and in a reaction mixture containing no more than about 90 weight percent inert solvent; wherein R is selected from the group consisting of alkyl and aryl and $R^1$ is alkyl.

2. The method according to claim 1 wherein the reaction is carried out in the absence of a solvent.

3. A compound of the formula

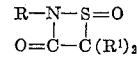

wherein R is alkyl of up to 18 carbon atoms or phenyl and R' is lower alkyl.

4. 4,4 - dimethyl-2-phenyl - 1,2 - thiazetidine-3-one-1-oxide.

(References on following page)

References Cited by the Examiner

UNITED STATES PATENTS 2,192,894  3/1940  Carswell ———————— 167—30

OTHER REFERENCES

Beecken et al., Tetrahedron, vol. 18 (December 1962), pages 1527–1531.

Gallo et al., Annali Chimica, vol. 52 (1962), pages 352–360.

Kharasch, Organic Sulfur Compounds, Pergamon Press, New York, vol. 1 (1961), pages 157 and 158.

Kresze et al., Angew. Chemie (internat. ed.), vol. 1 (1962), pages 96 and 97.

Leonard et al., Chemical Abstracts, vol. 43 (1949), page 5801h.

WALTER MODANCE, *Primary Examiner.*

NICHOLAS S. RIZZO, *Examiner.*

JAMES A. PATTEN, *Assistant Examiner.*